(No Model.)
W. MAXWELL.
ROTARY EXHAUST PUMP.
No. 364,533. Patented June 7, 1887.
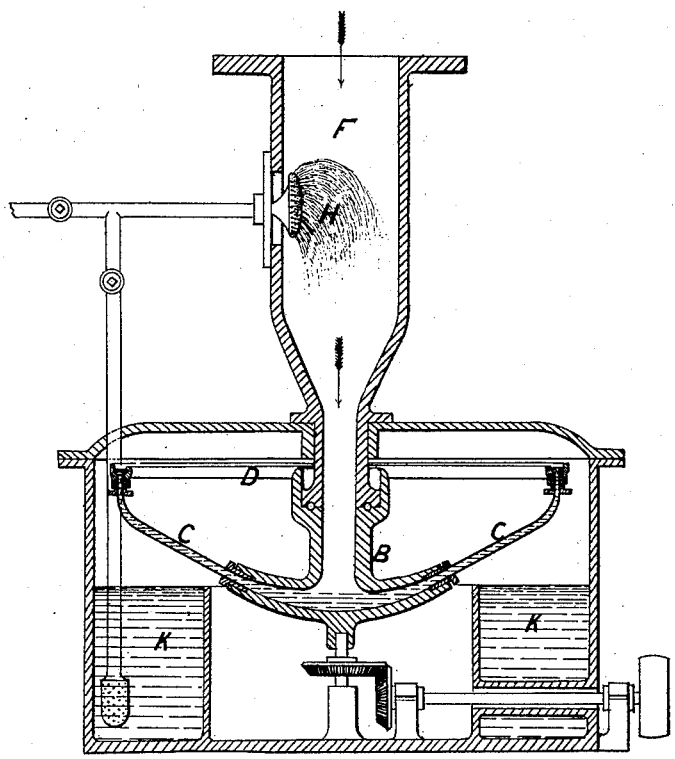
Witnesses
Inventor
William Maxwell
By James L. Norris.
Atty.

UNITED STATES PATENT OFFICE.

WILLIAM MAXWELL, OF FULHAM, COUNTY OF MIDDLESEX, ENGLAND.

ROTARY EXHAUST-PUMP.

SPECIFICATION forming part of Letters Patent No. 364,533, dated June 7, 1887.

Application filed March 16, 1887. Serial No. 231,128. (No model.) Patented in England December 15, 1885, No. 15,478; in France September 25, 1886, No. 178,731, and in Belgium September 29, 1886, No. 74,676.

*To all whom it may concern:*

Be it known that I, WILLIAM MAXWELL, a citizen of England, residing at Claybrook Road, Fulham, county of Middlesex, England, have invented a new and useful Rotary Exhaust-Pump, (for which I have obtained a patent in Great Britain, dated December 15, 1885, No. 15,478; in France, dated September 25, 1886, No. 178,731, and in Belgium, dated September 29, 1886, No. 74,676,) of which the following is a specification.

My invention relates to a construction and arrangement of rotary exhaust-pump acting, in conjuction with means for condensing, as an air-pump for steam-engines, as I will describe, referring to the accompanying drawing, which shows a vertical section of the pump.

A hollow boss, B, mounted on a vertical axis and rotated by suitable driving-gear, has an axial passage communicating with a pipe, F, down which the exhaust-steam passes, and, coming in contact with the water-jet H, is condensed thereby, the water of condensation flowing down into the chamber of the boss B. To this boss are attached radiating curved tubes C C, of small diameter, so arranged that by the centrifugal force due to their rotation with the boss the air and water in the latter will be simultaneously discharged through the tubes C into a trough, D, to which their upper ends are attached, and from which the water flows down into the tank K below. The tank K may extend entirely under the pump, and the water, instead of entering above by the nozzle H, may enter the hollow boss B from below and be distributed by a perforated nozzle within the passage descending to the boss.

By providing the trough D for the tubes C to deliver the water into a store of water is maintained at the mouths of the tubes, which can flow back into the tubes on a decrease of speed occurring, and thus prevent the air from entering so as to destroy the vacuum formed.

Having thus described the nature of my invention and the best means I know of carrying the same out in practice, I claim—

1. A rotary pump for exhausting condensed steam and air, consisting of a revolving hollow boss or chamber from which radiate curved tubes of small diameter, and which communicates by an axial passage with a pipe or chamber in which steam is condensed, so that the condensed steam falls down into the revolving boss or chamber and is ejected thence, together with any air accompanying it, by the centrifugal action of the radial tubes, substantially as herein described.

2. In a rotary pump arranged to operate with condensing water, as the air-pump of a steam-engine, the combination of the revolving hollow boss or chamber B with tubular arms C and trough D, operating substantially as herein described.

In testimony whereof I have signed my name to this specification, in the presence of two subscribing witnesses, this 2d day of March, A. D. 1887.

WM. MAXWELL.

Witnesses:
    OLIVER IMRAY,
*Patent Agent, 28 Southampton Bldgs., W. C.*
    JNO. P. M. MILLARD,
*Clerk to Messrs. Abel & Imray, Consulting Engineers and Patent Agents, 28 Southampton Buildings, London, W. C.*